United States Patent
Lorenz et al.

(10) Patent No.: US 9,174,567 B2
(45) Date of Patent: Nov. 3, 2015

(54) MOTOR VEHICLE HAVING A DEVICE FOR INFLUENCING THE VIEWING DIRECTION OF THE DRIVER

(71) Applicant: Bayerische Motoren Werke Aktiengesellschaft, Munich (DE)

(72) Inventors: Lutz Lorenz, Schwabach (DE); Thomas Lindberg, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 210 days.

(21) Appl. No.: 13/856,817

(22) Filed: Apr. 4, 2013

(65) Prior Publication Data

US 2013/0222212 A1 Aug. 29, 2013

Related U.S. Application Data

(63) Continuation of application No. PCT/EP2011/067356, filed on Oct. 5, 2011.

(30) Foreign Application Priority Data

Oct. 5, 2010 (DE) .......................... 10 2010 041 961

(51) Int. Cl.
 *B60Q 1/00* (2006.01)
 *B60K 35/00* (2006.01)
 (Continued)

(52) U.S. Cl.
 CPC . *B60Q 1/00* (2013.01); *B60K 35/00* (2013.01); *B60Q 9/008* (2013.01); *G02B 27/01* (2013.01);
 (Continued)

(58) Field of Classification Search
 CPC ................................. B60Q 1/00; B60Q 3/00
 USPC .................................... 345/7; 340/901, 425.5
 See application file for complete search history.

(56) References Cited

U.S. PATENT DOCUMENTS 5,347,293 A  9/1994 Wiedemann et al.
5,815,068 A *  9/1998 Vadseth ...................... 340/332
 (Continued)

FOREIGN PATENT DOCUMENTS

DE  35 32 120 A1  3/1987
DE  38 30 695 A1  3/1990
 (Continued)

OTHER PUBLICATIONS

International Preliminary Report on Patentability (PCT/IB/373) and Written Opinion (PCT/ISA/237) dated Apr. 9, 2013 (Six (6) pages).
 (Continued)

*Primary Examiner* — Quan-Zhen Wang
*Assistant Examiner* — David Lee
(74) *Attorney, Agent, or Firm* — Crowell & Moring LLP

(57) ABSTRACT

A motor vehicle with a device for influencing the viewing direction of the driver has a hazard detection and warning output device and a display unit for displaying information contents and/or entertainment contents. The display unit is arranged essentially centrally in the dashboard of the motor vehicle. The passenger compartment of the motor vehicle has a lighting device that is suitable for outputting a dynamic light animation and extends essentially from the display unit to the driver's field of vision on the windshield of the motor vehicle. A light animation that constitutes a movement of light in the direction of the driver's field of vision can be outputted, in order to output a warning about a hazard that relates to or could relate to what is happening on the road in front of the motor vehicle.

18 Claims, 5 Drawing Sheets

(51) Int. Cl.
*B60Q 9/00* (2006.01)
*G02B 27/01* (2006.01)

(52) U.S. Cl.
CPC ... *B60K 2350/1068* (2013.01); *B60K 2350/203* (2013.01); *B60K 2350/2013* (2013.01); *B60K 2350/2043* (2013.01); *B60K 2350/2052* (2013.01); *B60K 2350/962* (2013.01); *G02B 2027/0141* (2013.01); *G02B 2027/0187* (2013.01)

(56) References Cited

U.S. PATENT DOCUMENTS

| | | | |
|---|---|---|---|
| 2006/0181483 A1* | 8/2006 | Ari | 345/8 |
| 2008/0168387 A1* | 7/2008 | Brownrigg et al. | 715/799 |
| 2008/0203755 A1* | 8/2008 | Bourgeois-Jacquet et al. | 296/97.5 |
| 2008/0316011 A1 | 12/2008 | Kirsch et al. | |
| 2009/0165140 A1* | 6/2009 | Robinson et al. | 726/26 |
| 2009/0231116 A1 | 9/2009 | Takahashi et al. | |
| 2009/0243880 A1* | 10/2009 | Kiuchi | 340/903 |

FOREIGN PATENT DOCUMENTS

| | | |
|---|---|---|
| DE | 100 21 101 A1 | 11/2001 |
| DE | 10 2008 001 031 A1 | 10/2009 |
| DE | 10 2008 051 385 A1 | 4/2010 |
| FR | 2 578 797 A1 | 9/1986 |
| JP | 2003-291688 A | 10/2003 |
| WO | WO 2007/028630 A1 | 3/2007 |

OTHER PUBLICATIONS

Corresponding International Search Report with English Translation dated Mar. 28, 2012 (four (4) pages).
German Search Report with English Translation dated Jun. 29, 2011 (ten (10) pages).

* cited by examiner

MOTOR VEHICLE HAVING A DEVICE FOR INFLUENCING THE VIEWING DIRECTION OF THE DRIVER

CROSS REFERENCE TO RELATED APPLICATIONS

This application is a continuation of PCT International Application No. PCT/EP2011/067356, filed Oct. 5, 2011, which claims priority under 35 U.S.C. §119 from German Patent Application No. DE 10 2010 041 961.3, filed Oct. 5, 2010, the entire disclosures of which are herein expressly incorporated by reference.

BACKGROUND AND SUMMARY OF THE INVENTION

The invention relates to a motor vehicle with a device for influencing the viewing direction of the driver. The motor vehicle has systems and devices for detecting hazards and systems and devices for outputting at least one warning of a detected hazard. The motor vehicle further has a display unit for displaying information contents and/or entertainment contents, and this display unit is arranged essentially centrally in the dashboard of the motor vehicle.

The current trend in modern vehicles of making available the possibility of displaying information contents and/or entertainment contents enhances the comfort of the vehicle occupants, but can also distract their attention from the traffic scene. In particular, it allows many modern vehicles to display information contents and/or entertainment contents on a display unit that is disposed more or less in the middle of the instrument panel or, more specifically, the dashboard, and, if desired, slightly tilted towards the driver. Such a display unit is also referred to below as the central information display (CID). Any movement of the driver's eyes to look in the direction of the CID automatically results in the driver no longer looking directly at what is happening on the road in front of him.

Even if a vehicle has means for detecting hazards and means for outputting warnings of detected hazards, it is frequently not sufficiently possible to draw the driver's attention to the traffic situation at the appropriate moment.

The object of the present invention is to provide a motor vehicle that improves attention control in the event of a hazardous situation.

This and other objects are achieved with a motor vehicle having a device for influencing the viewing direction of the driver, wherein the motor vehicle includes devices for detecting hazards and for outputting at least one warning of a detected hazard, as well as a display unit for displaying information contents and/or entertainment contents, and the display unit is arranged essentially centrally in the dashboard of the motor vehicle. The passenger compartment of the motor vehicle has a lighting device that is suitable for outputting a dynamic light animation and extends essentially from the display unit to the driver's field of vision on the windshield of the motor vehicle. A light animation that constitutes a movement of light in the direction of the driver's field of vision can be output in order to output a warning about a hazard that relates to or could relate to what is happening on the road in front of the motor vehicle.

In the motor vehicle according to the invention, the passenger compartment of the motor vehicle has a lighting device that is suitable for outputting a dynamic light animation and extends essentially from the display unit to the driver's field of vision on the windshield of the motor vehicle. Upon detection of a hazard that relates to or at least could relate to what is happening on the road in front of the motor vehicle, a dynamic light animation that constitutes a movement of light in the direction of the driver's field of vision can be outputted, in order to output a warning about this hazard.

As a result, the driver's eyes are drawn away from the display unit to the traffic scene with the aid of the dynamic light animation. In this context, it is assumed that the driver can survey the traffic situation the best, if his eyes are focused on the so-called driver's field of vision on the windshield of the motor vehicle, i.e. the region of the windshield, through which an imaginary connecting line typically extends between the eyes of the driver and the traffic-related objects located in the foreground or, more specifically, in the direction of travel of the motor vehicle.

According to a preferred embodiment of the present invention, the lighting device extends at least partially in essence in a line-like manner along an extension line from the display unit to the driver's field of vision; and the light animation is configured in such a way that the depicted movement of light occurs along the extension line. In this case the term "in a line-like manner" is defined as essentially long and narrow. Preferably, the lighting device extends at least partially more or less straight along a straight line of extension. However, the term "in a line-like manner" is not to be construed absolutely in the sense of a straight line, but rather the line can also extend, for example, in a curved fashion, with corners and/or in a serpentine manner.

The lighting device can comprise a row of several light emitting diodes that can be arranged individually along the extension line and can be lit sequentially, in order to contribute to the light animation. Light emitting diodes are very small and can be manufactured in such a way that they have a low installation height, have fast reaction times, and, hence, can be operated in a "flash mode" manner, and require a small amount of energy. Therefore, they lend themselves extremely well to making a row of small light sources, through which a light animation "travels" by means of a sequential illumination of the individual light sources. What is meant by a sequential illumination also includes the case of an illumination that is offset in time and in which two or more adjacent light sources glow simultaneously in a transition period. It goes without saying that the use of other light sources that exhibit the same suitability for implementing the present invention is equivalent to the use of light emitting diodes.

According to a first design variant of the present invention, the lighting device consists of the row of light emitting diodes, i.e. does not comprise any additional light sources; and the light animation consists exclusively of the sequential illumination of the light emitting diodes.

According to a second design variant of the present invention, the lighting device comprises, furthermore, the display unit itself; and in order to show the movement of light, a graphics animation can then be output on the display unit; and this graphics animation comprises a graphics movement that flows into the extension line and is continued by way of the sequential illumination of the light emitting diodes. Then, the driver's eyes are drawn first to the graphics animation, then follow the graphics movement that flows into the extension line and finally follow, guided by the sequential illumination of the light emitting diodes, the extension line.

In this context the graphics movement can comprise, in particular, a compression and/or movement of a screen image, shown beforehand by the display unit, if desired also an edge trimming. The screen image, shown previously by the display unit, is simply "removed" from the driver's view. If the graphics movement runs more or less in the direction of the extension line and flows, from the viewer's point of view, even into the extension line, then the viewer or, more specifically, the driver, may get the impression that the screen image, shown by the display unit, is being literally "absorbed" along the extension line or rather is being drawn into this extension line. Then, the rest of the light animation along the extension line can be perceived by the viewer or more specifically by the driver (even though this perception is no longer based on the graphics, but purely on a light effect, in particular, the sequential illumination of the light emitting diodes) as an additional movement of the "absorbed" screen image along the extension line.

If the motor vehicle has a head-up display, then it may be advantageous, if during and/or after the output of the light animation, an image of the screen image that was shown previously by the display unit is presented at least temporarily by the head-up display. Then the screen image that has "travelled," as described above, along the extension line actually appears again in the driver's field of vision, or optionally somewhat below the driver's field of vision, in any event in the vicinity thereof. The image in the driver's field of vision can be shown, if desired, with less resolution, less true to detail and/or less color (if desired, also in monochrome), without diminishing the desired effect.

After a defined display period, the display of the head-up display can be hidden again, in order to be able to actually release again the driver's gaze, which is now diverted in the direction of the driver's field of vision, for this field of vision.

If the lighting device comprises a row of several light emitting diodes, which are arranged individually along the extension line and which can be lit up sequentially, then it may be advantageous, if the distance of the individual light emitting diodes to the driver's field of vision increases. On the one hand, the desired "pivoting" of the driver's eyes towards the end of the extension line has already been introduced and does not require any close guidance. On the other hand, the driver's view of the individual light points, which he perceives as being farther away from him, can be brought visually closer together in many cases, if the light emitting diodes are arranged along the surface of the dashboard of the motor vehicle. This applies especially if the dashboard is curved in a convex manner.

From viewpoints relating to, among other things the design and ergonomic operation, it is, furthermore, advantageous to embed the light emitting diodes into the material of the dashboard in such a way that the result is an essentially flat surface of the dashboard. To this end it is possible to use, in particular, light emitting diodes that have a flat design, for example, made according to SMD [surface mounted device] technology and that are inserted, in particular, adhesively cemented, into suitably provided recesses of the dashboard. The insertion can be carried out subsequently or as early as during the fabrication of the dashboard. If a thin and totally or partially transparent material layer is applied over the light emitting diodes, then the result is a homogeneous surface of the dashboard without having to tolerate too great a loss with respect to the visibility of the light of the light emitting diodes.

If the motor vehicle has devices for outputting different warning stages for the warning of a detected hazard, in particular, for outputting an early warning and an acute warning, then the light animation is output preferably exclusively in the case of a low warning stage; if an early warning and an acute warning are available, then only in the case of the early warning.

According to a preferred embodiment of the present invention, the motor vehicle has a device for detecting the viewing direction of the driver, and the output of the light animation is executed as a function of the detected viewing direction. On the one hand, the output can take place simply and easily, only if the driver's eyes are actually drawn away from what is happening on the road, in particular, when the driver's eyes are focused on a CID of the motor vehicle. On the other hand, the light animation can begin, if desired specifically, at the place, at which the driver's eyes are currently looking. However, on the other hand, the light animation can be configured, if desired, in such a way that the depicted light movement can run at different speeds. Then the light movement could be depicted at such a speed that the driver's eyes could, in fact, also track it. If the driver's eyes fall behind the light movement, this light movement is slowed down, as required. If the driver's eyes move ahead, the light movement is speeded up, as required.

The invention is based, among other things, on the following considerations.

The current state of the art relating to driver assistance systems (FAS) and driver information systems (FIS) has made great strides independently of the manufacturers. For example, the following driver assistance systems are already being offered on the market by leading automobile manufacturers in the area of active safety: collision warning systems, lane change warning systems, lane departure warning systems, night vision including pedestrian warning systems. Furthermore, the following types of FIS are already being offered on the market: navigation system, entertainment (radio, TV, DVD . . . ) systems, telephones, internet, etc.

Even with respect to warning strategies in the event of a risk of a collision, various approaches are known from the prior art. All of the aforementioned FASs have as their goal to warn the inattentive driver of a potential hazard, such as a collision with other traffic participants or a leaving of one's driving lane. In the case of a collision warning system, the distance to the traffic participant driving ahead is detected by way of a radar sensor; and a time to collision (TTC) is computed from the speed differential. Based on this TTC, the result is a time-based warning threshold. At almost all of the leading automobile manufacturers the two stage warning concept has become a standard, before a (partially) autonomous braking action may or may not take place. In a system offered by the applicant, the driver receives an early warning (stage 1—visual cue) in the form of a symbol in the instrument cluster and in the head-up display (HUD) in the event of a critical rear-end collision situation and upon undershooting a first warning threshold. If the driver fails to react and, as a result, a second warning threshold is undershot, an acute warning (stage 2—visual and auditory cues) is sent in the form of a high frequency warning sound and a flashing symbol in the instrument cluster and on the HUD. In addition, in many of the known systems the driver's viewing direction is analyzed by use of a camera in the passenger compartment; and the warning is sent earlier in time when the driver takes his eyes away and in critical situations.

With respect to a display and operating concept (ABK) for a driver information system (FIS), the prior art also discloses a multitude of solutions. The IDrive concept that was originally introduced by the applicant has become the standard in the automobile industry for operating FISs. It is based on a clear separation between the operating elements (in the center console) and display (display in the middle of the instrument cluster). The most important entertainment, communications, navigation and comfort functions can be activated and controlled by way of the IDrive controller.

Based on the current state of the art and the increasing availability of inexpensive high-technology automobile components, it is assumed that the majority of the modern vehicles will have in the future a camera in the passenger compartment that "watches" the driver and that can be employed to analyze the driver's state (fatigue, degree of attentiveness, viewing direction, blinking, etc.). Furthermore, it is most likely that in the very near future the installation of full color HUDs will be possible or even common. Such features will make it possible to display graphics in different colors on the HUD (for example, images that can be shown only with a so-called CID [a central information display] in the middle of the instrument cluster in vehicles with the technology that is currently available on the market).

The warning concepts that are available on the market today still have drawbacks in certain situations. For example, when using an FIS during a trip the driver's eyes typically move back and forth between the CID (central information display) in the passenger compartment and the traffic scene that is located in front of the vehicle (seen through the driver's field of vision in the windshield). In the case of functions (for example, destination input, navigation) that require a relatively long total operating period, the maximum amount of time that the driver's eyes are drawn away from the road lane or more specifically the traffic scene can be relatively long.

A purely visual early warning (for example, in the form of a yellow symbol in the instrument cluster and on the HUD) that is outputted upon undershooting a first warning threshold, cannot be perceived in every practical case, because at this instant the driver's eyes are not focused on the CID. If upon undershooting a second warning threshold an acute warning is outputted in the form of a non-directed auditory output (for example, a gong) and, if desired, combined with a visual warning that is more intensive now (for example, a red flashing symbol in the instrument cluster and on the HUD), the driver perceives, first of all, the spatially non-directed auditory output with a high degree of certainty at least in cases, in which the early warning was not noticed and the driver's eyes were still on the CID. This auditory output can lead to a relatively long processing time or, more specifically, reaction time. In the final end the driver has to interpret first the purely auditory output and then compare with the situation ("What is the reason for the gong"). Therefore, the driver's reaction (braking action) may come too late, thereby increasing the risk of an accident.

Other objects, advantages and novel features of the present invention will become apparent from the following detailed description of one or more preferred embodiments when considered in conjunction with the accompanying drawings.

DETAILED DESCRIPTION OF THE DRAWINGS

An alternative warning system is provided in the event of the risk of a collision and a distraction due to an auxiliary task. The objective of this approach is to solve, in particular, the following question or rather problem: What is the fastest way of drawing the driver's attention (in particular, his eyes) back to the road lane in the event of a risk of a collision and a distraction due to an auxiliary task? The answer to this question entails three approaches to solving this problem. All three of these approaches confine themselves to visual warning outputs. In order to shorten the reaction times even more, the following described concepts could be combined with auditory outputs (multi-modal warning concepts). Furthermore, the three approaches to solving the problem can also be combined with each other.

In the following it is assumed for all three approaches to solving the problem that the driver's viewing direction is analyzed by a camera in the passenger compartment (for example, underneath the instrument cluster). Thus, the alerts are triggered only if it is ensured that the driver's eyes are focused on the CID. If there is no system for detecting the driver's viewing direction, then the viewing direction and/or the degree of driver distraction can be estimated, for example, with the aid of an active display on the CID or by means of the type and frequency or, more specifically, the frequency of the operator control inputs of the driver.

Furthermore, in the following it is assumed for all three approaches to solving the problem that the alert is triggered only if a hazard is detected in front of the vehicle, in particular, if there is a critical rear-end collision situation, for example, the vehicle driving ahead suddenly brakes and, as a result, at least one warning threshold is undershot.

First Approach—Visual Warning Output Directly on the CID

Figure 1:
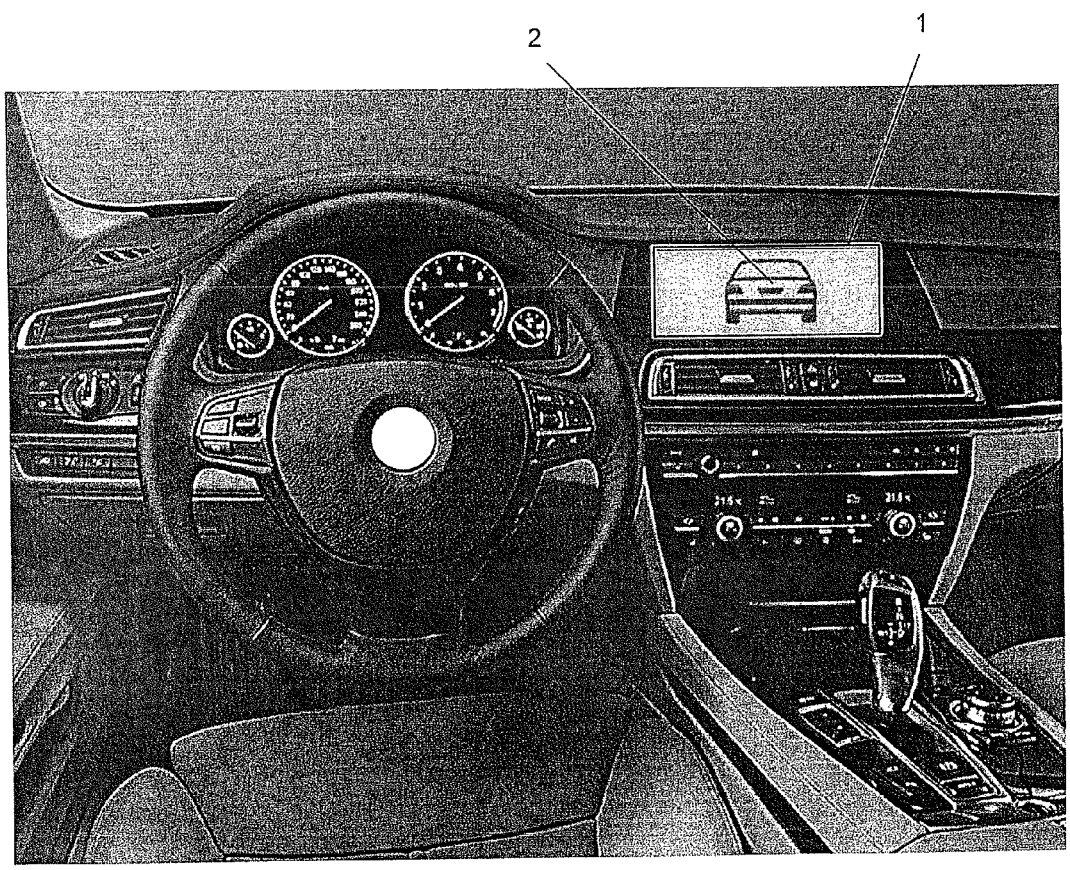
FIG. 1 is an interior view of a motor vehicle in which a visual warning is output directly on the CID.

Referring to FIG. 1, since a visual early warning in the instrument cluster or, more specifically, on the HUD during a user input on the CID can be easily missed, a visual warning 2 is output directly on the CID 1 (in the example according to FIG. 1, the warning is output as a display of a symbol of a vehicle). Hence, the visual warning is output directly at a place on which the driver's eyes are currently focused.

Second Approach—Dynamic Visual Warning Output "Flying Page" for Intuitive Guidance of the Driver's Eyes One basic idea, on which the second approach is based, is to control the eye movements of the driver by the use of moving displays. The eye is supposed to track intuitively a dynamic animation to a destination point (primary field of vision=road lane or, more specifically, the traffic scene). Should the driver have focused his eyes on, for example, a list menu on the CID in a rear-end collision situation, then the entire content of the menu (that is, the CID screen image depicted at the (starting) time of the warning) moves at a suitable speed (inside the limits of the perception range) in the direction of the road lane. The driver's eyes that are fixed on the menu move intuitively along with the movement in the direction of the base of the windshield (this strategy is in keeping with the theory, or rather the requirement, of a smooth eye movement/smooth pursuit according to Krauzlis & Lisberger, 1994). In order to induce a destination, or more specifically the end, of the eye movement, the previously displayed list screen from the CID is shown as the destination place on the HUD. This CID image is displayed preferably only as long as it may be found in the peripheral field of vision, that is, during the smooth eye movement. As soon as the driver's eyes are focused in the direction of the HUD, i.e. on the road lane, the CID image vanishes from the HUD, in order to avoid a fixation on this CID image.

Figure 2A:
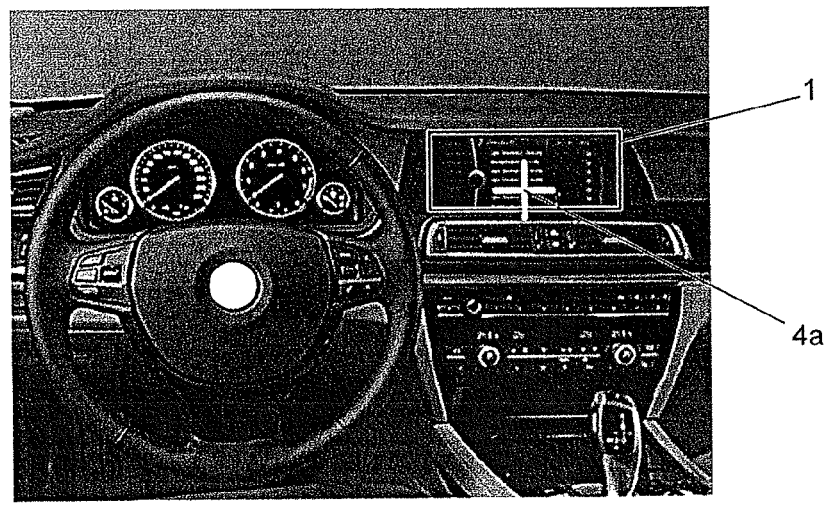
FIGS. 2a-2e are a sequence of images of an interior of the vehicle illustrating a dynamic visual warning output.
Figure 2B:
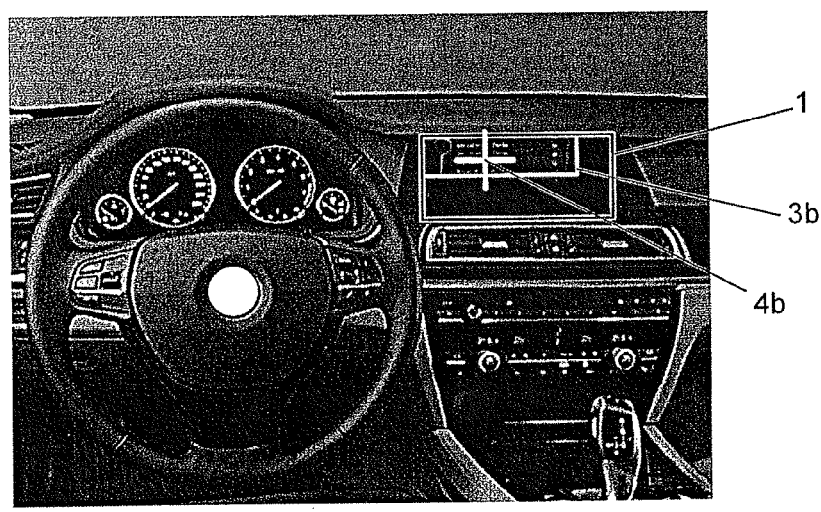

FIGS. 2a, 2b, 2c, 2d, 2e (to be understood as a chronological sequence of snapshots) elucidate a preferred of the second approach. FIG. 2a shows the CID 1 displaying a "normal" display of a list menu that the driver has pulled down and is looking at. The cross 4a symbolizes the (main) viewing direction of the driver. In FIG. 2b the dynamic visual warning output has already begun. The screen image, which is shown as still complete and without distortion in FIG. 2a, has already been moved to some extent "out of the CID 1" in FIG. 2b. Only a reduced image region 3b can still be seen in the upper left hand corner of the CID 1. In the present case, the screen image has been moved primarily with respect to FIG. 2a. In addition or as an alternative, a compression and/or trimming of the screen image, displayed at the starting time of the warning, could also be perceived.

Figure 2C:
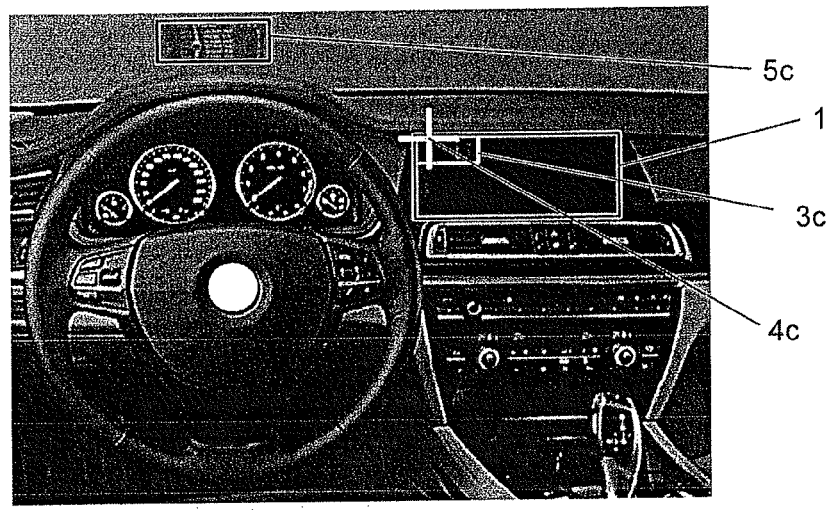
Figure 2D:
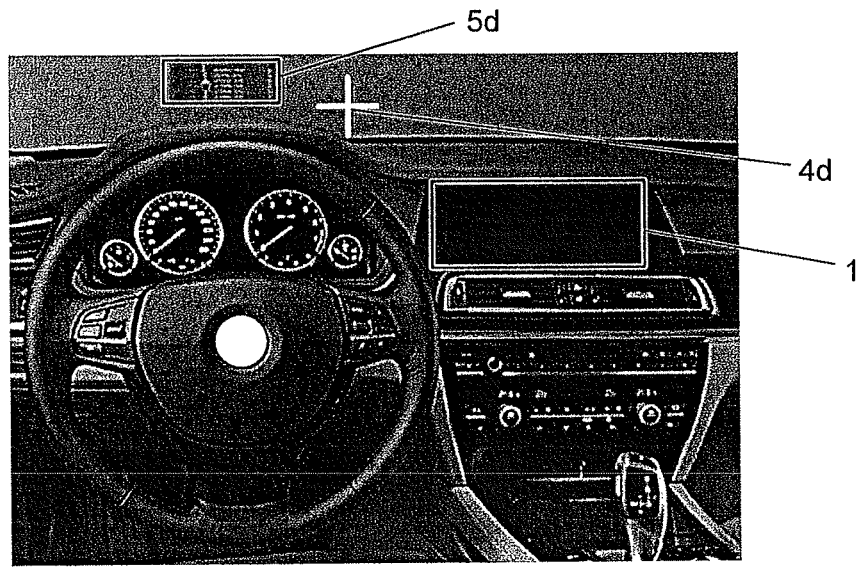
Figure 2E:
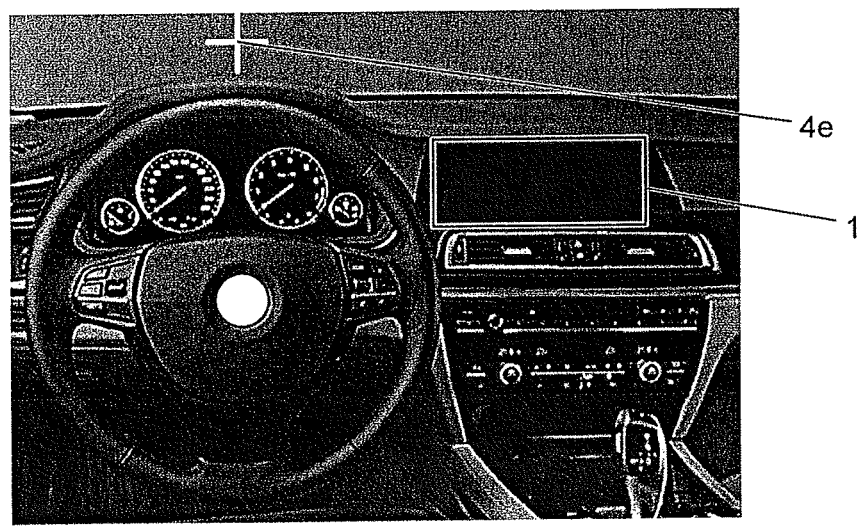

The continuous transition from FIG. 2a to FIG. 2b produces in the viewer the impression that the screen image, displayed at the starting time of the warning, is moving or, more specifically, is flying "out of the CID" in the direction of the traffic scene. The driver's eyes follow the "flight" of the screen image (cf. the viewing direction cross 4b). In FIG. 2c, the screen image is shifted even further "out of the CID 1." What can be seen is only a vanishingly small image region 3c in the upper left hand corner of the CID 1. The driver's eyes continue to follow the "flight" of the screen image (cf. the viewing direction cross 4c). In order to prevent the driver's eyes from sweeping too far and in order to direct his eyes extremely quickly into the desired direction, i.e. to the traffic scene, the HUD shows an image 5c of the CID screen image displayed at the starting time of the warning. In FIG. 2d the screen image has vanished from the CID 1 in its entirety. At this point the driver's eyes continue to pursue the "flight" of the screen image out of the CID (cf. viewing direction cross 4d). However, the driver's eyes have not been "caught" yet by the display 5d on the HUD. Therefore, the driver's eyes have not arrived there yet. Finally, in FIG. 2e, the driver's eyes have arrived at the display of the HUD (cf. viewing direction cross 4e); and the display of the HUD is hidden again.

Third Approach—Dynamic Visual Warning Output "LED Animation" for Intuitive Control of Eye Movements Even the third approach is based on the idea of controlling eye movements by means of moving displays. The eye is supposed to intuitively track a dynamic animation to a destination point (primary field of vision=road lane or more specifically the traffic scene). Owing to the geometric arrangement of the display locations in the vehicle, the movement of the animation between the CID and the base of the windshield in the second approach ("flying page") is interrupted. Therefore, this break is bridged by use of an LED strip. In the event of a warning, the menu, shown on the CID, disappears; and an LED animation starts. The (hardware) LEDs, which are integrated preferably in the dashboard, continue to guide the driver's eyes as far as to the base of the windshield. As a result, the driver's eyes are guided in an intuitive way as far as the road without any spatial interruption. The hardware LEDs could be integrated to great advantage in the dashboard so that they are perceived by the driver only in the lit state.

Figure 3A:
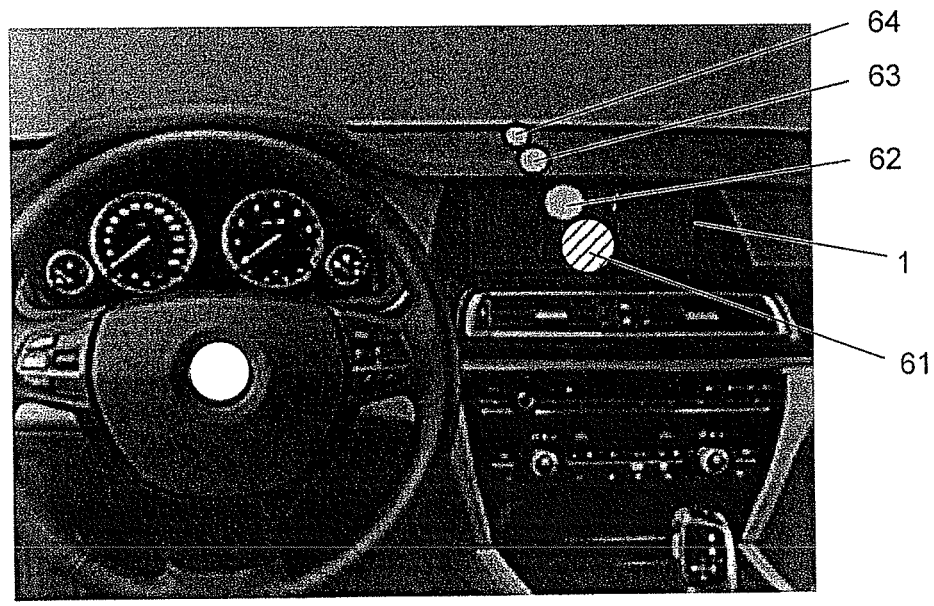
FIGS. 3a-3d are a sequence of images of an interior of the vehicle illustrating another dynamic visual warning output.
Figure 3B:
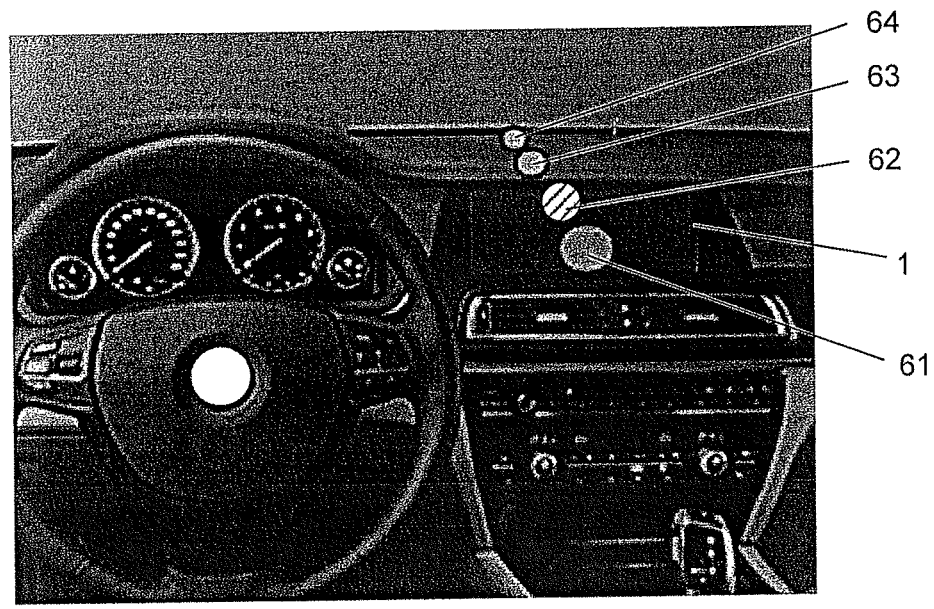
Figure 3C:
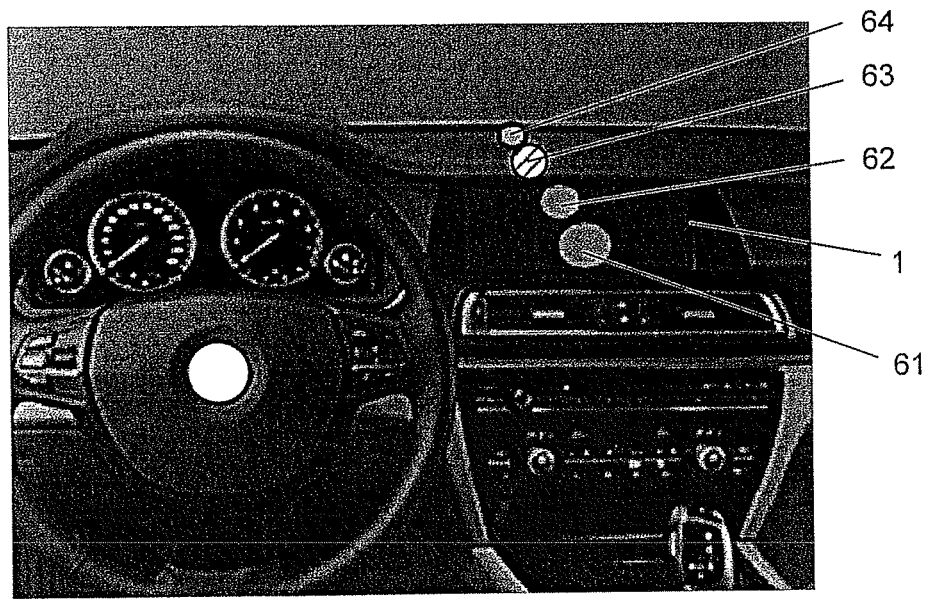
Figure 3D:
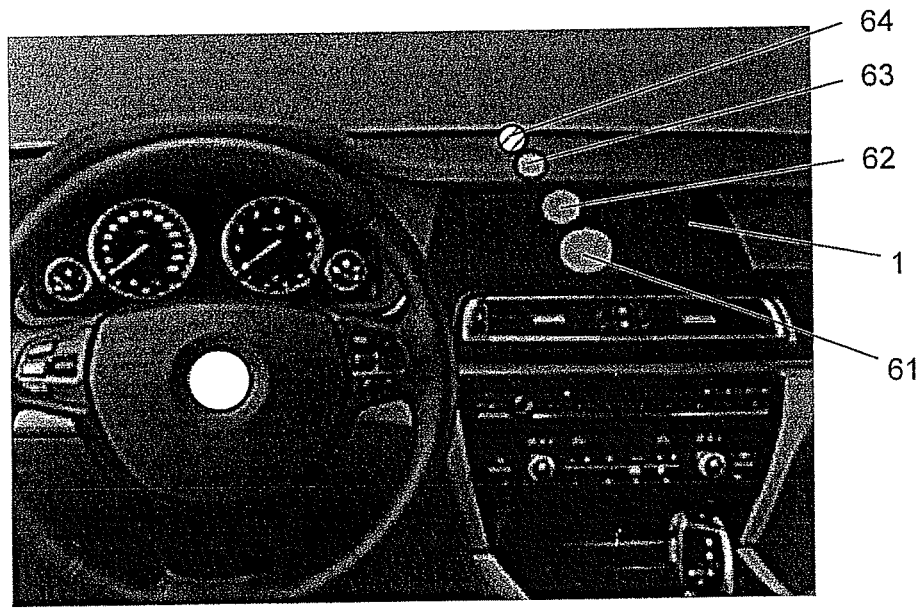

FIGS. 3a, 3b, 3c, 3d (to be understood as a chronological sequence of snapshots) elucidate a preferred embodiment of the third approach. Between the CID 1 and the driver's field of vision in the windshield there is a row of light emitting diodes 61, 62, 63, 64. (The schematic representation according to FIGS. 3a, 3b, 3c, 3d could give cause for the false conclusion that the light emitting diodes 61 and 62 are arranged in front of or on the CID 1. However, this is explicitly not the case, but rather is the result only of the schematic character of the FIGS. 3a, 3b, 3c, 3d). In FIG. 3a the dynamic visual output of a warning has already begun. The light emitting diode 61 is lit up (represented by the shading in FIG. 3a) and, therefore, represents a light point. The rest of the light emitting diodes 62, 63, 64 are still dark. In FIG. 3b the light point that was located before "at" the light emitting diode 61 has moved on to the light emitting diode 62. At this point the light emitting diode 62 is lit up (represented by the shading in FIG. 3b). The rest of the light emitting diodes 61, 63, 64 are dark. In FIG. 3c the light point that was located previously "at" the light emitting diode 62 has moved on to the light emitting diode 63. At this point the light emitting diode 63 is lit up (represented by the shading in FIG. 3c). The rest of the light emitting diodes 61, 62, 64 are dark. In FIG. 3d the light point that was located previously "at" the light emitting diode 63 has moved on to the light emitting diode 64. At this point the light emitting diode 64 is lit (represented by the shading in FIG. 3d). The rest of the light emitting diodes 61, 62, 63 are dark. Hence, the row of light emitting diodes is used for outputting a light animation that represents a light point moving along the row. The driver's eyes intuitively track the movement of the light point. The number of light emitting diodes (four in this example) has to be suitably chosen as a function of the spatial conditions between the CID and the base of the windshield. In particular, this number should be large enough to produce at least approximately the impression of a continuous movement of the light point.

The three approaches share the common feature that upon detection of a hazard (in particular, the risk of a collision) and simultaneous distraction of the driver's eyes, a visual warning is displayed exactly at the place, or rather "begins" exactly at the place, at which the driver is looking at that instant. The starting point is the use case of carrying out an auxiliary task in the motor vehicle (for example, a navigation input) in the CID. Basically the driver's eyes can be moved intuitively faster away from the CID to the hazardous situation (for example, a decelerating vehicle travelling in front) by way of visually dynamic warnings than by use of non-directed auditory warnings. In order to be able to coordinate the moving cues between the display sites in the vehicle, it is advantageous to evaluate on-line the driver's viewing direction by means of a camera in the passenger compartment.

The proposed approaches to finding a solution to the problem by use of intuitive warnings contribute to enhancing the driving safety and customer acceptance. In addition, the approaches can be easily transferred to other assistance systems, such as the lane departure warning system and the lane change assistance.

The proposed approaches can also be combined with one another. In particular, the second and third approaches can be combined to great advantage. If the screen image of the CID is then moved or rather compressed (cf. second approach) in the direction of the upper left hand screen corner (and, thus, in the direction of the driver's field of vision on the windshield), the result is that an eye movement in the direction of the driver's field of vision is initiated. Then this eye movement can be "taken over" or rather "absorbed" advantageously by an LED light animation (cf. third approach) and can be guided further in the direction of the driver's field of vision.

Based on the aforesaid, when the second and third approaches are combined, the display unit becomes a part of the "lighting device" recited in the claims. The light emitting diodes between the CID and the driver's field of vision form the "extension line," recited in the claims, or more specifically are "arranged along the extension line." The graphics output on the CID according to FIGS. 2a, 2b, 2c, 2d, 2e constitutes a preferred embodiment of a graphics animation that comprises a graphics movement that flows into the extension line (shift of the screen image, cf. reference numerals 3b and 3c). If a sequential illumination of the light emitting diodes is suitably coordinated with the graphics animation, then the graphics movement continues, from the driver's point of view, by use of the sequential illumination of the light emitting diodes.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle, comprising:
a hazard detection and warning output system;
a display unit operatively configured for displaying at least one of information contents and entertainment contents;
a dashboard of the motor vehicle, wherein the display unit is arranged essentially centrally in the dashboard;
a lighting device arranged in a passenger compartment of the motor vehicle, the lighting device being operatively configured to output a dynamic light animation and being configured to extend essentially from the display unit to a driver's field of vision on a windshield of the motor vehicle;
wherein the lighting device outputs the dynamic light animation comprising a movement of light away from the display unit and in a direction towards the driver's field of vision on the windshield in a direction of travel of the motor vehicle in order to provide a warning of a hazard relating to an event on a road in front of the motor vehicle.

2. The motor vehicle according to claim 1, wherein the lighting device is operatively configured to extend at least partially in essentially a line-like manner along an extension line from the display unit to the driver's field of vision; and
wherein the light animation is operatively configured such that the movement of light represented occurs along the extension line.

3. The motor vehicle according to claim 2, wherein the lighting device comprises a row of several light emitting diodes operatively arranged individually along the extension line and being lightable sequentially in order to contribute to the light animation.

4. The motor vehicle according to claim 3, wherein the light animation comprises exclusively the sequential illumination of the several light emitting diodes.

5. The motor vehicle according to claim 3, wherein the display unit forms a portion of the lighting device; and
wherein in order to illustrate the movement of light, a graphics animation is output on the display unit as a graphics movement that flows into the extension line and is then continued via the sequential illumination of the several light emitting diodes.

6. The motor vehicle according to claim 5, wherein the graphics movement comprises at least one of a compression and trimming of a screen image previously shown on the display unit.

7. The motor vehicle according to claim 6, further comprising:
a head-up display; and
wherein at least one of during and after the output of the light animation, an image of the screen image previously shown on the display unit is at least temporarily displayed by the head-up display.

8. The motor vehicle according to claim 3, wherein a distance of the several individual light emitting diodes to a driver's field of vision increases.

9. The motor vehicle according to claim 3, wherein the several light emitting diodes are arranged along a surface of the dashboard.

10. The motor vehicle according to claim 9, wherein the light emitting diodes are embedded into a material of the dashboard such that the dashboard has an essentially flat surface.

11. The motor vehicle according to claim 1, further comprising:
a viewing direction detection device operatively configured to detect a viewing direction of a driver of the motor vehicle; and
wherein the output of the dynamic light animation is executed as a function of the detected viewing direction of the driver.

12. A method for influencing a viewing direction of an occupant of a motor vehicle equipped with a hazard detection and warning system and a centrally arranged display unit configured to display information contents and/or entertainment contents, the method comprising the acts of:
detecting a potential hazard event on a road in front of the motor vehicle; and
as a function of the detected hazard event, outputting a dynamic light animation extending essentially from the display unit and towards a field of vision of the occupant on a windshield in the direction of travel of the motor vehicle.

13. The method according to claim 12, wherein the occupant is a driver of the motor vehicle and the dynamic light animation extends essentially from the display unit to the driver's field of vision on the windshield of the motor vehicle.

14. The method according to claim 13, wherein the dynamic light animation comprises at least partially an essentially line-like movement of light along an extension line from the display unit to the driver's field of vision.

15. The method according to claim 14, further comprising the acts of:
detecting a viewing direction of the driver of the motor vehicle; and
outputting the dynamic light animation beginning from the detected viewing direction.

16. The method according to claim 13, wherein the dynamic light animation comprises at least partially a movement of a screen image on the display unit in a direction of the driver's field of vision on the windshield of the motor vehicle.

17. The method according to claim 13, further comprising the acts of:
detecting a viewing direction of the driver of the motor vehicle; and
outputting the dynamic light animation beginning from the detected viewing direction.

18. The method according to claim 12, wherein the dynamic light animation comprises at least partially an essentially line-like movement of light along an extension line from the display unit to a driver's field of vision.

* * * * *